United States Patent
Bolin (10) Patent No.: US 8,320,937 B2
(45) Date of Patent: Nov. 27, 2012

(54) METHOD AND ARRANGEMENT FOR PROVIDING LOCATION INFORMATION ON A COMMUNICATION TERMINAL

(75) Inventor: Johan Bolin, Spänga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 387 days.

(21) Appl. No.: 12/377,521

(22) PCT Filed: Aug. 14, 2006

(86) PCT No.: PCT/SE2006/050281
§ 371 (c)(1),
(2), (4) Date: Jul. 22, 2010

(87) PCT Pub. No.: WO2008/020789
PCT Pub. Date: Feb. 21, 2008

(65) Prior Publication Data
US 2010/0304707 A1 Dec. 2, 2010

(51) Int. Cl.
*H04W 24/00* (2009.01)
(52) U.S. Cl. ........ 455/456.1; 455/456.2; 455/456.3; 455/404.2; 455/436; 455/439

(58) Field of Classification Search ........ 455/404.2, 455/414.2, 433, 432.1, 435.1, 436, 456.1–457, 455/461, 414, 443, 439–442
See application file for complete search history.

(56) References Cited

U.S. PATENT DOCUMENTS

| | | | |
|---|---|---|---|
| 6,324,404 B1* | 11/2001 | Dennison et al. | 455/456.1 |
| 7,711,094 B1* | 5/2010 | Olshansky et al. | 379/45 |
| 2002/0098851 A1* | 7/2002 | Walczak et al. | 455/456 |
| 2003/0036389 A1* | 2/2003 | Yen | 455/456 |
| 2005/0124355 A1* | 6/2005 | Cromer et al. | 455/456.5 |
| 2007/0249364 A1* | 10/2007 | Bells et al. | 455/456.1 |

* cited by examiner

*Primary Examiner* — Kathy Wang-Hurst (57) ABSTRACT

In a method and arrangement for providing a reliable location for a communication terminal, a first location is obtained for the terminal by means of a first access mechanism. A second location is also obtained for the terminal by means of a second access mechanism, and the obtained first and second locations are then compared. The location of the terminal is validated if the obtained first and second locations are found to be substantially equal. Thereby, a more reliable location of the terminal can be used to support communication services requiring or needing such position information, such as emergency services. The validated location of the terminal can also be used for validating the location of an end point used by the terminal in an access network with fixed end points, or for validating a used positioning mechanism.

24 Claims, 3 Drawing Sheets

METHOD AND ARRANGEMENT FOR PROVIDING LOCATION INFORMATION ON A COMMUNICATION TERMINAL

TECHNICAL FIELD

The present invention relates generally to a method and apparatus for certifying the location of a communication terminal. In particular, the invention can be used to ensure correct location information on calling parties when required for emergency calls, or when needed for various location-dependent services.

BACKGROUND

With the emergence of 3G mobile telephony, new packet-based communication technologies have been developed for communicating multimedia content. For example, technologies such as GPRS (General Packet Radio Service) and WCDMA (Wideband Code Division Multiple Access) support wireless multimedia telephony services involving packet-switched communication of data representing images, text, documents, animations, audio files, video files, etc., in addition to traditional circuit-switched voice calls.

Recently, a network architecture called "IP Multimedia Subsystem" (IMS) has been developed by the $3^{rd}$ Generation Partnership Project (3GPP), to provide multimedia services for mobile and fixed clients in the packet domain. IMS is generally a platform for multimedia services based on IP transport, more or less independent of the access technology used. Basically, any types of access networks with packet-switching capabilities can be connected to an IMS network, including networks based on GPRS/UMTS, WLAN, fixed broadband, cable television, DSLAM, Ethernet, etc. The concept of IMS networks is well-known in the field of telecommunication, and the various functions of the IMS network elements are not necessary to describe here to understand the present invention.

A specification for session setup has been defined called "SIP" (Session Initiation Protocol), which is an application-layer signalling protocol for controlling sessions over a packet-switched logic. SIP is independent of the underlying data transport technologies, and is generally used by session managing nodes in IMS networks in support of multimedia services.

One set of services that can be employed by means of an IMS network is the so-called "Presence" services. Presence services basically involve the publishing of "presence data" of a user to make it available for other users and applications, which can also be used to control further services in turn. Presence data basically defines the state or situation of a user and his/her equipment in some predefined respect.

The IMS architecture is based on a layered network structure where different communication functions are implemented in three main layers: an access layer, a session control layer and a service layer. The services in the service layer are basically independent of the technology and protocols used in the access layer. This layered architecture enables convergence of networks as various different access networks, both fixed and cellular/mobile, can be connected to one and the same IMS session management layer, sometimes referred to as the "IMS core".

Some services in the service layer, as well as certain session management functions in the session control layer, may need or even require information on the geographical location of a calling party. Examples of such services in IMS networks include presence services, messaging and various information services including GIS (Geographic Information System), presence-enabled buddy lists, "yellow pages" with regional information, and the "friend and family finder" function. Further, the setting of user policies, charging tariffs and other communication parameters may also depend on the user's current location.

In particular, location information may be of vital importance for calling subscribers in situations of emergency, such as accidents and diseases. An emergency call is typically first routed to an emergency centre which then connects the caller further to a local service station or the like depending on the current situation, e.g. a doctor, hospital, fire station or the police.

The requirements for emergency services are subject to regulations prevailing in different countries and regions. Typically, it is required that the telephony system can provide relevant location information in order to certify the location of the calling party. Firstly, an incoming emergency call should be connected to a suitable emergency centre being reasonably close to the caller, in the US referred to as the Public Safety Alarm Point (PSAP), which may be critical in some situations. Secondly, the caller may not, for whatever reason, be able to provide correct information regarding his/her whereabouts to the emergency centre or service station, at least not immediately, which may of course be crucial for taking further actions rapidly.

Figure 1:
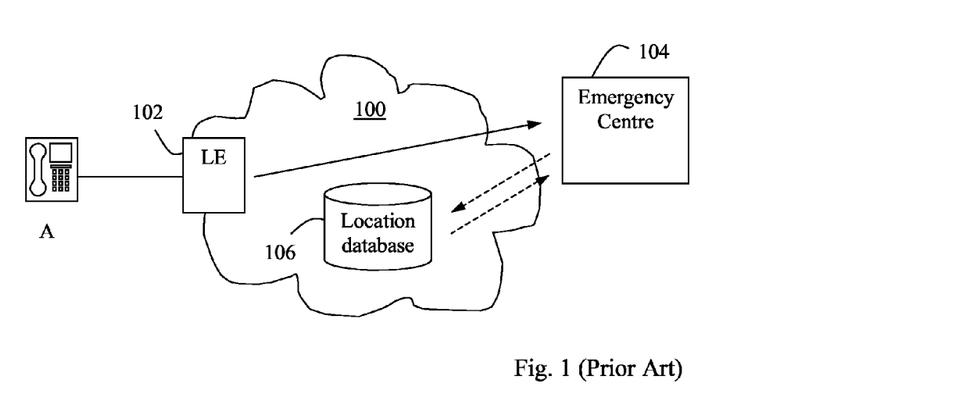
FIG. 1 is a schematic block diagram of a fixed communication network providing location information for an emergency call, according to the prior art.

FIG. 1 illustrates a subscriber terminal A connected to a traditional fixed telephony network 100 by means of a local exchange LE 102. Network 100 routes an incoming emergency call from subscriber A to an emergency centre 104. Network 100 further includes a location database 106 holding geographic location information on subscribers fixedly connected to the network 100, including subscriber A, e.g. in the form of local street addresses or the like.

It is typically required in fixed public networks that local exchanges therein ensures that a "calling party identifier" is included in emergency calls when routed to an emergency centre. In the present example, local exchange 102 has knowledge of subscriber terminal A being connected to a specific input line in the exchange 102, which is associated with a specific calling party identifier. The local exchange 102 thus supplies the calling party identifier of subscriber terminal A when transmitting the emergency call to emergency centre 104. Location database 106 stores the geographic location associated with the calling party identifier. Emergency centre 104 can thus retrieve that location from location database 106 by means of the calling party identifier received with the emergency call, as illustrated by the dashed arrows.

In a cellular network, a serving Mobile Switching Centre MSC can include location information in emergency calls from mobile terminals. The location information may be a cell identity (ID) or even more accurate information in the form of geographic coordinates derived by positioning functions employed in the network. A Mobile Positioning System (MPS) is often implemented in mobile networks, e.g. using signal strength and/or time alignment measurements on signals from different base station sites, known as "triangulation", to calculate the position of a mobile terminal. The location information may be sent once in an emergency call, or be constantly updated during the call if the calling terminal is moving.

Alternatively, a satellite based navigation system such as GPS (Global Positioning System) or Gallileo can be utilised. The terminal must then of course be equipped with a GPS receiver that must be able to receive the satellite signals. Moreover, the terminal must have a function to communicate the positioning result in a comprehensive and trusted manner to a session node handling the call in the session management layer. Dedicated positioning systems such as GPS typically takes some time to determine the position, even several minutes. Local regulations often define a maximum allowed delay for providing the location to the emergency centre, usually within a few seconds.

Today, different methods for determining the location are available in different types of access networks. For example, if a private LAN (Local Area Network) is connected to an end point of a public access network, a number of new end points within the LAN are effectively introduced. Thus, the geographic location of specific end points within the LAN are typically unknown to the public network, unless they are specifically reported to the public network for storage in a location database or the like.

Figure 2:
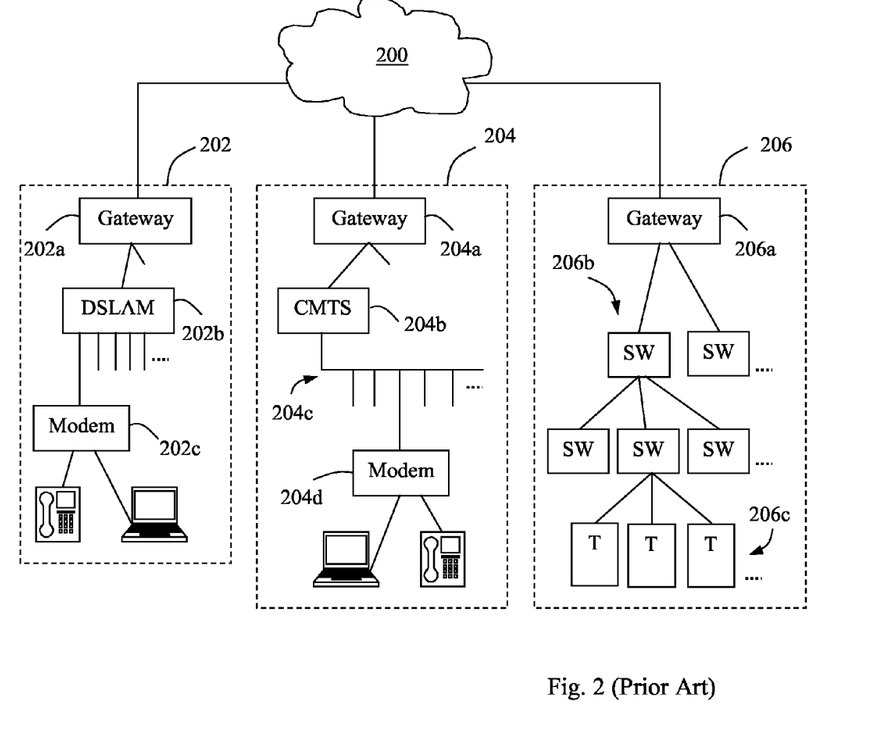
FIG. 2 is a schematic block diagram depicting three different conventional network types for fixed broadband access, according to the prior art.

FIG. 2 illustrates schematically three basic types of wire line access networks that are used today for IP-based broadband access, which are shown connected to a backbone network 200 such as the Internet. A first network type 202 is connected to a backbone network 200 by means of a gateway 202a, and is based on DSL (Digital Subscriber Line) technology. A switching node 202b referred to as DSLAM (DSL Access Multiplexor) is connected to a plurality of individual dedicated subscriber lines, where each subscriber uses a DSL type modem (modulator/demodulator) 202c (e.g. ADSL) for modulating signals from one or more connected IP terminals onto a conventional dual line copper wire, i.e. telephone wire. The DSLAM node 202b converts modulated signals received on each subscriber line into Ethernet language, and vice versa.

A second network type 204 is likewise connected to a backbone network 200 by means of a gateway 204a, and is based on cable television technology using coaxial or HFC (Hybrid Fibre Coax) antenna cables. A switching node 204b referred to as CMTS (Cable Modem Termination system) connects a common TV cable 204c, to which a plurality of cable modems 204d are connected for modulating signals from connected IP terminals onto the TV cable. The CMTS node 204b converts modulated signals received on the common TV cable 204c into Ethernet, and vice versa. The location of the specific end points is typically unknown, unless such information is added at the end points.

Finally, a third network type 206 is also shown connected to the backbone network 200 by means of a gateway 206a, based on Ethernet communication technology throughout. A plurality of switching nodes 206b are interconnected in a trellis-like structure. Further, a plurality of IP terminals 206c are shown connected to at least some of the switches 206b. It should be noted that the three access network types are illustrated here merely as basic examples of network architectures which may be combined in any suitable manner. Further, it is possible to, e.g., create a DSL type network using coaxial or HFC cables in the physical transport layer.

In this description, the above network types will be briefly referred to as "DSL network", "Cable network" and "Ethernet network", respectively. However, these access technologies more or less share the problem of obtaining reliable geographic location information for calling subscribers using ambulant terminals, and there are no built-in functions to this end as yet.

Even if one end point can be distinguished from other ones, each known end point must somehow be associated with location information such as a street address or geographical coordinates or the like, requiring that a location database is properly maintained for the known end points. Typically, the subscriber himself/herself must provide mapping information for a network address currently used, e.g. a layer 2 IP address, and a corresponding location, e.g. street address, for storage in the location database. It is therefore impossible to validate that the stored mapping information is correct for each call, particularly when subscribers move between different end points. Thus, such a location database is troublesome to maintain and still not wholly reliable.

Hence, the problem of determining the location of a terminal connected to a more or less fixed end point in a broadband network lies in certifying the location of that end point. In addition, the obtained location information must sometimes also be used for routing the call to the proper party, particularly in the case of emergency calls. This must also be done quite fast, preferably within a few seconds, often being subject to regulations. It may also be desirable to certify a location given in a process involving a terminal that is not wholly trustworthy, e.g. with respect to its functions or authenticity, etc.

In regard to the background description above, it is desirable to provide reliable location information in a call from a calling party connected to an access network, e.g. according to any of the above-described network types. It is particularly desirable to obtain reliable location information for emergency calls in a reasonably swift manner, e.g. in order to satisfy prevailing emergency requirements. It is also desirable to enable the swift selection of a suitable emergency centre to which an emergency call is to be routed, depending on the location of the calling subscriber.

Using an IMS network with separated access and session management layers that support several access network types (IP networks), e.g. using newly conceived access technologies and protocols, it is not evident how to provide location on calling parties in a sufficiently swift and reliable manner. The challenge lies in both how to perform the location determination and how to validate if it is trustworthy. In addition, the situation may become even more complicated when several different network operators are involved. The operator of an access network is not necessarily, and will often actually not be, the same as the operator of the IMS network, including the IMS Core.

For example, it is a problem with existing solutions for fixed broadband networks that in many access network types such as Cable networks or Ethernet networks, the existing solutions for location determination use pre-stored location information originally provided by the end users themselves, with no or very limited control mechanisms. Therefore, it is a problem that the network operator, typically being responsible according to regulations for routing emergency calls correctly, cannot verify if the location of a caller given by an access network is correct, if the access network depends on end user-provided, i.e. "unreliable", location information.

Another problem is that, even within an access network, the location can often be obtained in different ways with different reliability. For example, in the case of a mobile access network, a user client in the mobile terminal may be adapted to add an identity of the current cell in a header field such as, e.g., an existing header field called "P-Access-Network". However, a mobile terminal cannot always be trusted since it may be attacked by viruses or otherwise out of order, in a way that affects the above function.

SUMMARY

It is an object of the present invention to address at least some of the problems outlined above, and to provide a solution for obtaining more reliable location information for a communication terminal connected to an access network, e.g. for routing and/or supply to an emergency centre in connection with an emergency call. These objects and others may be obtained by providing a method and apparatus according to the attached independent claims.

According to one aspect, the present invention provides a method of providing a reliable location for a communication terminal. In the inventive method, a first location is obtained for the terminal by means of a first access mechanism. A second location is also obtained for the terminal by means of a second access mechanism, and the obtained first and second locations are then compared. The location of the terminal is validated as being reliable if the obtained first and second locations are found to be substantially equal.

The validated location can be used and/or saved to support any service(s) needing or requiring that location. The validated location may further be saved by storage in a location server or database in a communication services network serving the terminal, and may then be indicated or marked as validated in the location server or database using a suitable term such as "reliable", "confirmed", "certified", "verified", "validated", or similar.

The first and second access mechanisms may be used in different access networks, and the validation process can be triggered when a re-registration message is received from the terminal after handover from an old access network to a new access network. The old access network may be an access network with fixed end points, and the new access network may be a mobile/cellular network, or vice versa. The validated location of the terminal may then further be used for validating the location of an end point used by the terminal in the access network with fixed end points. The access network with fixed end points may be a WLAN with user-provisioned end point locations, and locations in the mobile/cellular network can be obtained from cell IDs or by means of a triangulation method.

It is also possible that the first and second access mechanisms are used within the same access network.

Different positioning methods may be used in the first and second access mechanisms, respectively, to obtain the first and second locations. The validated location of the terminal can then be used for validating at least one of the positioning methods.

If the obtained first and second locations are not found to be substantially equal, new locations may be obtained by means of the first and second access mechanisms alternately and each new obtained location is then compared with the previously obtained location, until the location finally becomes validated when substantially equal according to both of said first and second access mechanisms. Alternatively, a new pair of locations may be obtained for the terminal by means of the first and second access mechanisms, and the obtained new pair of locations are compared to validate the location of the terminal if found to be substantially equal.

The compared locations may be found to be substantially equal if the difference there between does not exceed a predefined equality criterion. If these substantially equal locations are different within the predefined equality criterion, a mean value of the substantially equal locations may be calculated as the validated location, or one deemed more reliable than the other may be selected as the validated location.

According to another aspect, the present invention provides an arrangement for providing a reliable location for a communication terminal. The inventive arrangement comprises means for obtaining a first location for the terminal by means of a first access mechanism, means for obtaining a second location for the terminal by means of a second access mechanism, means for comparing the obtained first and second locations, and means for validating the location of the terminal as being reliable if the obtained first and second locations are found to be substantially equal.

The arrangement may further comprise means for using and/or saving the validated location to support any service(s) needing or requiring said location, and means for saving the validated location by storage in a location server or database in a communication services network serving the terminal. The arrangement may then further comprise means for indicating or marking the validated location as validated in the location server or database.

The arrangement may further comprise means for using the validated location of the terminal for validating the location of an end point used by the terminal in an access network with fixed end points.

The arrangement may further comprise means for using different positioning methods in the first and second access mechanisms, respectively, to obtain the first and second locations, and means for using the validated location of the terminal for validating at least one of the positioning methods.

The arrangement may further comprise means for obtaining new locations by means of the first and second access mechanisms alternately, if the obtained first and second locations are not found to be substantially equal, and means for comparing each new obtained location with the previously obtained location, until the location finally becomes validated when substantially equal according to both of said first and second access mechanisms.

The arrangement may also comprise means for obtaining a new pair of locations for the terminal by means of the first and second access mechanisms, if the obtained first and second locations are not found to be substantially equal, and means for comparing the obtained new pair of locations to validate the location of the terminal if found to be substantially equal.

The arrangement may further comprise means for calculating a mean value of the compared substantially equal locations as the validated location or for selecting one deemed more reliable than the other as the validated location, if the two compared locations are different within a predefined equality criterion.

Further features and benefits of the present invention will become apparent from the detailed description below.

BRIEF DESCRIPTION OF THE DRAWINGS

The present invention will now be described in more detail and with reference to the accompanying drawings, in which.

DETAILED DESCRIPTION

Briefly described, the present invention enables a more reliable determination of the location for a communication terminal, which can be used to support communication services needing or requiring such location information, such as emergency services in particular.

An embodiment will now be generally described with reference to FIG. 3, where a terminal A is connected to a service network 300 containing a location server 302. In this general embodiment, service network 300 represents any fixed or mobile network that provides communication services for terminal A, including services where the position of terminal A may be needed or even required, e.g. emergency services, as exemplified in the background section above. For example, service network 300 may be an IMS network to which a plurality of separate access networks can be connected according to the above.

The location server 302 is adapted to retrieve and maintain the current location of terminal A in order to provide this information in connection with calls involving terminal A, if necessary, or if the location of terminal A is needed for any third party services when terminal A's current location is available for other users/applications, e.g. presence services. For example, the location of terminal A may be needed instantly to route an emergency call therefrom to the correct emergency centre, etc. Location server 302 is thus adapted to keep track of the location of terminal A when registered as present in the network 300, and if terminal A changes its location, the location server 302 should be updated accordingly.

In some types of access networks, as mentioned above, positioning methods are used that can be deemed as more or less "reliable", such as mobile networks using triangulation and certain access networks with fixed end points having certified the position of their end points, e.g. DSL networks. However, other network types may use positioning methods that are deemed "unreliable", such as mobile networks using a cell ID which may not be sufficiently accurate in large cells, or cable networks and Ethernet networks being dependent on user-provisioned location information. The present invention is intended to generally increase the reliability of location determination for such an access network.

Figure 3:
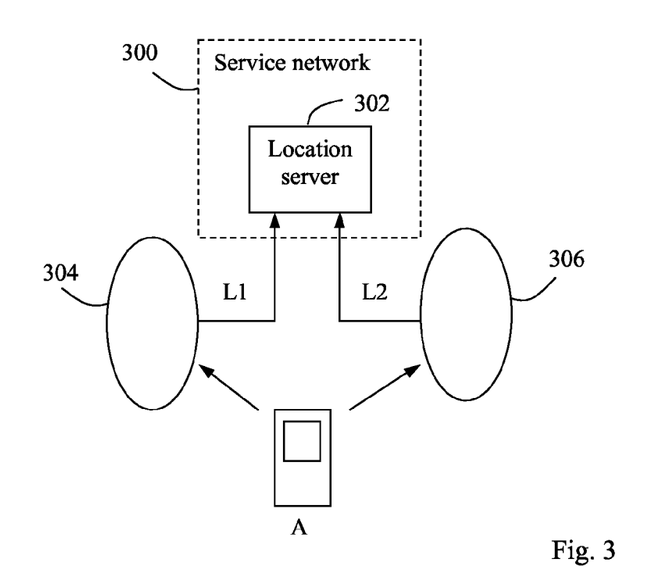
FIG. 3 is a schematic diagram illustrating a way of providing a more reliable location for a communication terminal, in accordance with the present invention.

In the embodiment shown in FIG. 3, a first location L1 of terminal A is determined by means of a first access mechanism 304, schematically illustrated in the figure, which is provided to the location server 302. In this context, the term "Access mechanism" should be understood in a broad sense to represent any technology or routines that can be used to derive the location of a terminal, including cell ID and triangulation methods in mobile networks, as well as stored location information (e.g. user-provisioned) for fixed end points or access points in access networks, etc.

If the first location L1 is deemed unreliable, a second location L2 is determined by means of a second access mechanism 306, which is likewise provided to the location server 302. If the two determined locations L1 and L2 are found to be substantially equal, the location of terminal A is thereby validated, even if each location L1, L2 might be deemed unreliable by themselves. The validated location obtained in this way for terminal A can now be used for any services and/or calls where it is needed or required.

Furthermore, when the terminal is connected to a certain fixed access point or end point in an access network, e.g. a WLAN or similar, the validated location of terminal A can also be used for validating the location of that access point or end point in general, i.e. also when other terminals are connected thereto. For example, if a location database is maintained for fixed end point locations (typically user-provisioned) in the network, the validated location obtained for terminal A above can be indicated or marked therein as a validated, i.e. "reliable", location for the end point itself, currently used by terminal A. If any other terminal executes a call or session from that end point later on, the reliable location can be retrieved from the location database which is not necessary to validate once again, being marked validated/reliable, e.g. to support that call or session.

Still further, it is also possible to utilise the above-described procedure for location validation of terminals in order to even validate a used positioning mechanism in general. For example, if a certain positioning mechanism in a network has proved successful for a number of location validations, that positioning mechanism may then be deemed "reliable" in itself for further location determinations, e.g. in a specific region, and can be relied upon in the future without validation from another positioning mechanism. In this context, it is also possible to assign a certain "confidence" value to a positioning mechanism. For example, a confidence value may be: "the resulting location is expected to be correct with 99% probability", or: "the resulting location is expected to be correct within 100 m with 99% probability", or similar.

In this description, the term "reliable" is used to mark an obtained location (for a terminal, fixed end point or positioning mechanism) when that location has been validated by being equal in two different access mechanisms according to the above. However, it should be noted that any other suitable term may be used to indicate a location as validated in a location database or the like, such as "confirmed", "certified", "verified", "validated", etc. In the same manner, a location that has not been validated may be marked as "unreliable" or any other suitable term to that effect such as "unconfirmed", "not verified", "not validated", etc.

In order to perform the location validation of terminal A described above, the two different access mechanisms 304, 306 may be selected in several ways, according to further embodiments, to be described in more detail below. Furthermore, access mechanisms in different access networks or different access mechanisms within the same access network, may be used for positioning a terminal, and the present invention is not limited to any specific access mechanisms. For example, the first access mechanism may involve a positioning method in one cell of a mobile network, and the second access mechanism may utilise the same positioning method as the first access mechanism, but in another cell within reach of the terminal.

If the determined locations L1 and L2 are found to be wholly different, at least to a certain predefined extent, a third location may be derived by means of any of the first and second access mechanisms 304,306, this time using a higher level of accuracy as compared to determining the previous location L1 or L2. This process may be repeated alternately for the two access mechanisms 304,306, until locations determined by means of the two access mechanisms, respectively, are found to be substantially equal, e.g. within a certain predefined limit. At that point, the location of terminal A is confirmed or "validated", and can therefore be deemed reliable for use in support of any communication service(s) that may need or require the position of terminal A. The validated location is finally saved by storage in location server 302, or more generally in a database available thereto.

As mentioned above, this location validation can also be used for determining a reliable location for a network end point itself to which terminal A is connected, which can be used for further terminals connected to that end point later on. The validated location of that end point can then be marked "reliable" in the location database (e.g. in location server 302), to indicate that no further validation is necessary to execute for that end point when other terminals are connected thereto. Furthermore, it is also possible to indicate the accuracy of the stored end point location, e.g. within 100 m, depending on the accuracy of the positioning method used in the validating access mechanism. Then, the indicated location accuracy may or may not be sufficient depending on requirements of the service used for a terminal connected to the end point. If not, the terminal may be further positioned to obtain the required accuracy.

Figure 4:
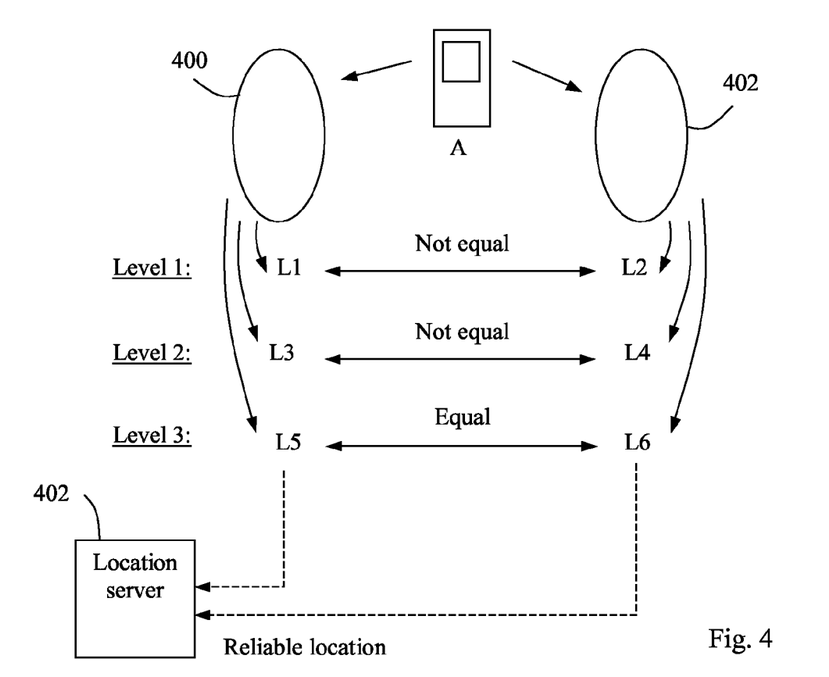
FIG. 4 is a schematic diagram illustrating an embodiment for providing a validated location for a communication terminal.

Thus, new attempts of location validation for a terminal may be executed using two different access mechanisms alternately at increasingly high levels of accuracy, until the location finally becomes validated by being equal according to both access mechanisms 304,306. As mentioned above, several different positioning methods are often available, e.g., the cell ID method and various triangulation methods of varying accuracy in mobile or cellular networks. The process of alternating location determination by means of different access mechanisms is schematically illustrated in FIG. 4, involving two separate access mechanisms 400 and 402 used by a communication terminal A.

At a first level of accuracy denoted "Level 1", locations L1 and L2 are determined by means of the access mechanisms 400 and 402, respectively, each location L1, L2 being deemed unreliable by itself. The locations L1 and L2 are then compared and are not found to be equal in this example, e.g. according to some predefined accuracy hereafter referred to as an "equality criterion". Therefore, a new pair of locations L3 and L4 are determined by means of the access mechanisms 400 and 402, respectively, preferably using a higher second level of accuracy, "Level 2". Since neither the new determined locations L3 and L4 are found to be equal when compared, a further pair of locations L5 and L6 are likewise determined using an even higher third level of accuracy, "Level 3". In this case, locations L5 and L6 are in fact equal, thereby validating the location of terminal A, and the resulting location is finally stored in a location server 404. If the two last determined locations L5, L6 still differ somewhat, although within an acceptable limit, i.e. predefined equality criterion, a mean value may be calculated for storage, or one deemed more reliable than the other may be selected for storage.

In a slightly modified procedure, each newly determined location may be compared with the previously determined location such that, after locations L1 and L2 have been found unequal, location L3 is determined and compared with L2. Then, if L2 and L3 are not equal, location L4 is determined and compared with L3. Further, if L3 and L4 are neither equal, location L5 is determined and compared with L4, and so forth. The location of terminal A may then be validated as soon as two compared locations are found equal.

As in the shown example, the procedure of validating the location of terminal A by comparing locations derived from two different access mechanisms, is preferably executed by a location server or the like in a communication services network to which terminal A is connected or belongs to, e.g. an IMS network. Alternatively, this validation procedure may be implemented in the terminal itself, in which case the terminal finally sends the validated location to the location server for use and/or storage. Of course, it is then assumed that the terminal is equipped with a suitable functionality that can be deemed trustworthy for such location validation.

Figure 5:
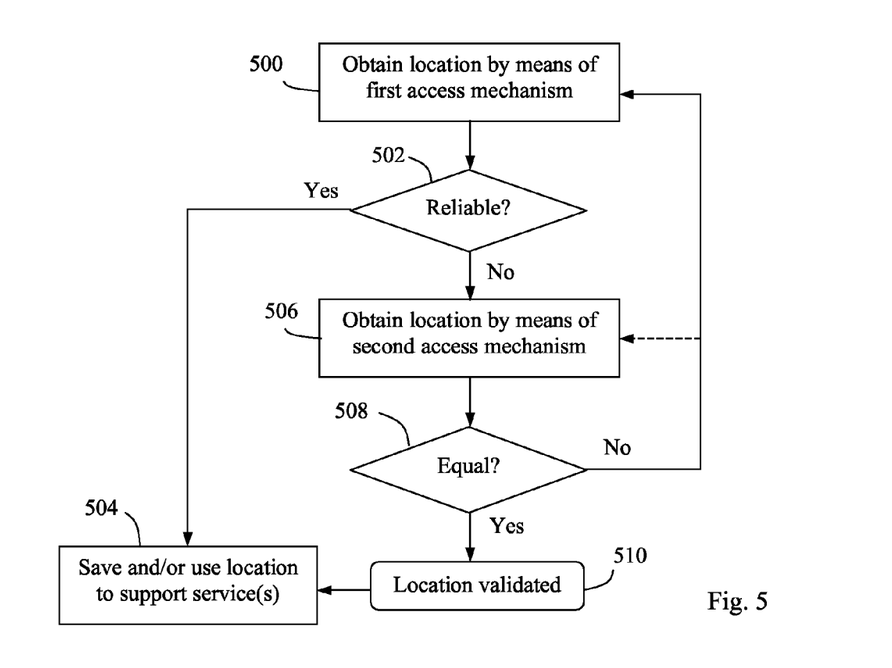
FIG. 5 is a flow chart illustrating a procedure for providing a validated location for a communication terminal, typically executed by a location server or the like in a communication services network.

FIG. 5 is a flow chart with steps in a procedure for providing a validated location for a communication terminal, which can also be used, e.g., for validating a fixed end point in an access network, or even for validating a used positioning mechanism in general, as described above. For example, the following procedure may be used for the embodiment illustrated in FIG. 4. In a first step 500, a first location for the terminal is obtained by means of a first access mechanism, e.g. using a positioning method in an access network to which the terminal is currently connected.

It is then determined in a next step 502 whether the obtained first location can be deemed reliable or not. If so, the reliable location is saved and/or used in a step 504, depending on the nature of the connection and/or service requirements. The obtained reliable location can be stored in a location server or the like, and can also be used immediately or later to support any communication service(s) that might need or require the location of the terminal. For example, if the terminal is a swiftly moving mobile terminal it may not be necessary to save the obtained location for later use if not needed immediately, as it will be outdated shortly. On the other hand, if the terminal is connected to a fixed end point in an access network, the obtained location can be saved as a validated end point location for later use when other terminals becomes connected thereto.

However, if the first location cannot be deemed reliable in step 502, a second location is obtained by means of a second access mechanism, in a following step 506, which may use another positioning method in the current access network, or any positioning method in another access network different from the connected one. For example, the terminal may have made a handover or generally changed connection to another network at some point between steps 500 and 506. Alternatively, the terminal may be forced to make connection to the other access network, at least temporarily, for the purpose of obtaining the second location. Depending on the access capabilities of the terminal, it may do so without loosing connection with the original network, or may return thereto immediately after the second location has been obtained.

In a next step 508, the obtained first and second locations are compared to determine if they are more or less equal or not, to some predefined extent. A certain acceptable margin of difference may have been predefined in this respect. The condition or criterion for declaring the two locations equal can be defined in different ways, although the present invention is generally not limited in this respect. The equality criterion may be defined based on the expected accuracy of the used positioning method and access mechanism, and/or a confidence value assigned to the positioning method, etc.

If the obtained first and second locations are equal, e.g. according to a predefined equality criterion, the location is validated as indicated by a step 510, and can be deemed reliable even if the obtained first and second locations cannot be deemed reliable by themselves. In that case, the process can move on to step 504, where the validated location is saved and/or used to support any communication service(s) if needed or required immediately or in the future. As mentioned above, the reliable location is saved and/or used depending on the nature of the connection and/or service requirements In some situations, the location may be needed immediately, e.g. if an emergency call is received from the terminal to be routed to a suitable emergency centre reasonably close to the calling terminal, and possibly also requiring that the location information is supplied together with the call.

As mentioned above, the obtained reliable location can also be used for validating an end point in an access network, or even for validating a used positioning mechanism. In a possible implementation, two separate location databases may be maintained: a first database with positions associated with individual terminals/users, and a second database with positions associated with fixed end points and/or with positioning mechanisms having assigned confidence values.

However, if the obtained first and second locations are not found to be equal in step 508, the process is continued as follows. If the outcome of step 508 is negative, the location may still be saved (not shown here) but should then be marked "unconfirmed" or the equivalent, to indicate that the saved location needs to be validated in order to be deemed reliable.

Thus, the process now continues by obtaining a third location by means of either the first access mechanism in step 500, or alternatively by means of the second access mechanism in step 506, as indicated by a dashed arrow. Depending on the implementation, a fourth location may also be obtained, by means of either the second or the first access mechanism depending on the previous step, to be compared with the third one in step 508. Optionally, the third location obtained in either step 500 or 506 may be compared with the second or first one in step 508, to see if it is necessary to continue to obtain the fourth location if not equal. Hence, when repeating the process, i.e. after the comparison step 508 has indicated not equal, the sequence of steps 500-508 may be varied in any suitable manner, depending on the implementation. For example, each new obtained location may be compared with the immediately previous one if the two access mechanisms are used alternately, as mentioned above in connection with FIG. 4.

Embodiments useful for further implementations in different cases will be described in more detail below. For example, when the terminal to be located is connected to an IMS network, a validation procedure may be triggered by various IMS events occurring when the terminal changes connection between different access networks, or re-establishes a session using a new access network, and possibly also when a user changes the terminal to another terminal.

Such IMS events typically involve various SIP messages referred to as "REGISTER", "DE-REGISTER" "RE-REGISTER", "THIRD PARTY REGISTER" and "EVENT REGISTER", as well as other SIP messages. The validation procedure may also be initiated separately besides the above activities. The above SIP messages can be further used to trigger the above-described location validation procedure, and to transport the resulting validated location to a receiving party, i.e. using "piggybacking".

The validation procedure may also be executed when the location is determined in two or more different access networks, in order to validate the location or a used positioning mechanism in at least one of these.

Figure 6:
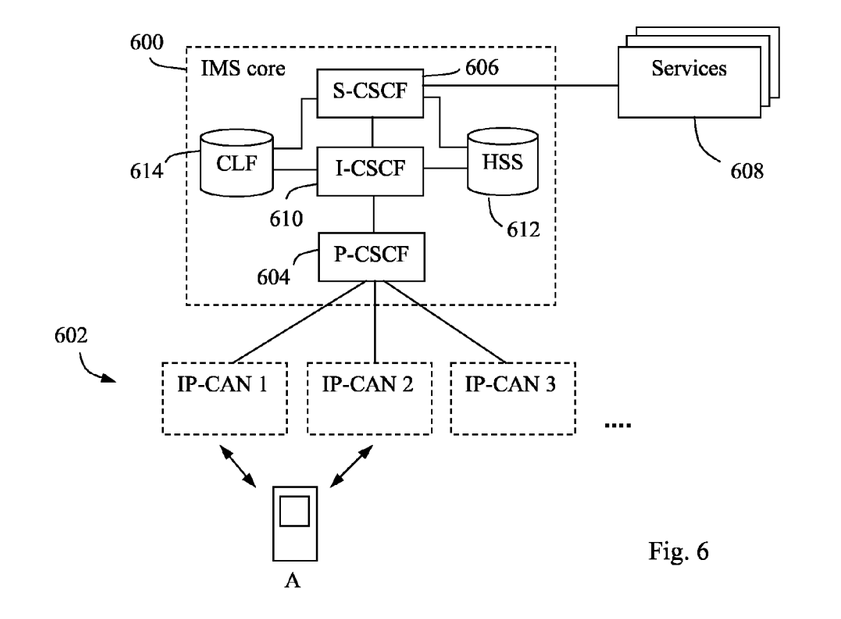
FIG. 6 is a block diagram illustrating a more detailed scenario where the location of a communication terminal can be validated, according to further embodiments.

In one exemplary situation illustrated in FIG. 6, a terminal A to be located is connected to an IMS core 600 in the "home" IMS network of the subscriber using terminal A. Various access networks 602 of different types, sometimes referred to as "IP-CAN's" (IP Connectivity Access Networks), are connected to the IMS core 600, and the terminal can use at least some of these to access the IMS network. In the session control layer according to the layered IMS system, session and user management takes place in the IMS core 600 by means of different well-known CSCF (Call Session Control Function) nodes, which will be briefly outlined here.

The P-CSCF (Proxy CSCF) node 604 generally serves as an entry point for terminals to the IMS network. Thus, the access networks 602 are connected to the P-CSCF node 604 via Border Gateways (not shown). The P-CSCF node 604 routes SIP messages between terminal A and an S-CSCF (Serving CSCF) node 606 in its home IMS network, which handles session setup between terminal A and any invoked communication services 608 in the service layer. These services may be implemented in application servers or the like. The I-CSCF (Interrogating CSCF) node 610 is generally used by the P-CSCF node 604 to find the correct S-CSCF node for a specific user. Further, a main database element HSS (Home Subscriber Server) 612 stores subscriber and authentication data that any application servers and S-CSCF nodes can retrieve for executing services and sessions for users.

When a user registers in the IMS network, i.e. turns on his/her IMS terminal, or plugs in an IMS IP telephony terminal, or starts an IMS-compatible client on his/her PC, information on which access network the user is currently connected to is stored in the HSS database. In the example shown in FIG. 6, terminal A is initially connected to IP-CAN 1, and this information is stored in HSS database 612 when terminal A registers with the IMS network.

If the user changes connection to another access network, e.g. in a handover from a mobile network to a wireless LAN network or vice versa, a re-registration is done in the IMS network for the user involving updating the access network information in the HSS database 612. Here, terminal A changes connection from IP-CAN 1 to IP-CAN 2, which is stored in the HSS 612 accordingly. This process can be utilised for validating the terminal location by obtaining locations in both access networks IP-CAN 1 and IP-CAN 2.

The location validation may be triggered in different ways. To minimise the impact on existing routines, it may use signalling being done anyway, e.g. registration signalling of various forms. It can also be triggered by signalling to set up sessions, or when notification is being sent, or when presence data is updated. The location validation may also be initiated actively e.g. by the user or as part of an authorization procedure of a certain connection (e.g. a cable modem being authorized to be used as connection to the IMS).

For example, the re-registration may thus trigger that a new location is obtained in the new network, to be compared with a location obtained in the previous network, the latter location preferably being marked as "unconfirmed" or the like when saved. If the two obtained locations are equal, the location is validated and can be marked as "validated", "reliable" or "confirmed" or any other suitable term to that effect.

As described above, different methods and functions are available in the different access networks 602 to determine and represent a geographical location of a user terminal. In mobile or cellular networks, these methods spans from the relatively accurate A-GPS and various triangulation methods to the simpler and less accurate Cell-ID method, the latter simply using the geographical coverage area of a base station to represent a terminal location. The location accuracy will then naturally depend on the cell size. Since the Cell-ID is simply an ID number, the mobile network operator must translate it into a geographical position in a format comprehensive outside the operators network, e.g. given by a longitude and a latitude and possibly also an approximate radius of the cell.

In fixed and wireless LAN networks, the terminal location can be determined and presented in several different ways. In ETSI (European Telecommunications Standards Institute), a working group called TISPAN (Telecom and Internet Services and Protocols for Advanced Networks) has been involved with the adoption of IMS technology in fixed networks. A function has been defined called the CLF (Connectivity Session Location and Repository Function) for mapping an IP address (possibly also MAC address) to a geographical address, e.g. given as a street address, longitude/latitude coordinates or some other suitable geographical representation that can be used by IMS networks, primarily to provide location information for emergency calls. In FIG. 6, a CLF database 614 is shown in the IMS core 600.

However, in many types of access networks, the information provided by the CLF function cannot be deemed reliable.

In DSL networks, where each end point has a dedicated and known physical network connection, the available location information can generally be deemed reliable, but in other networks this may not be the case. For example, in cable networks, it is mostly not feasible to certify the location of each end point, typically relying on user-provisioned location information as mentioned above. The situation is similar for Ethernet networks.

Some exemplary location validation procedures that can be used to implement the present solution will now be described in more detail, and with further reference to FIG. 6.

As mentioned above, the validation may be triggered by various registration procedures, using messages such as Register, Re-Register, De-Register, 3:d Party Register, or Event Register. When an IMS terminal is turned on, or when a client is started in a terminal, the user and his/her terminal is registered in the IMS core 600. A SIP Register message is sent from the terminal through the P-CSCF node 602 to the S-CSCF node 606, the latter now being informed that the user/terminal has been registered. S-CSCF node 606 also sends a message to the HSS database 612.

A field in the header of the received SIP message is called "P-Access-Network" where location related information can be inserted. If a mobile network is used for access, this field will typically contain the cell ID, but may also contain other location-related information such as measurement results that can be used in a triangulation calculation. Other fields or bodies can also be used to carry location information, including new standardised header and/or body fields, or existing fields according to standard or according to operator defined usage and syntax.

When a registration is performed, the S-CSCF node, or possibly an E-CSCF (Emergency) node handling emergency calls, can forward the received Register message (modified or not) to other IMS entities, which may be a location server or the like in the user's home network, or possibly in a visiting network. Then, depending on the currently used access network, which is possible to identify by means of available routing information if not clearly stated in the Registration message, the location server can decide to perform an active positioning on the terminal, in order to validate the location stated in the message header. In this case, the location in the header has actually been obtained by means of a first access mechanism (e.g. a connection with a serving cell), and the location of the active positioning is then obtained by means of a second access mechanism (e.g. a triangulation method), hence in accordance with the procedures described for FIGS. 3-5.

It may also be possible to communicate other information than the terminal location to the location server for database storage, in order to enable the location validation. For example, this information may be routing information, network information and terminal information. The location validation may either utilise functions in the access network currently used, or the terminal may be forced to temporarily change its access to another network for the validation, as mentioned above. Of course, the latter option is possible only if the terminal is located within coverage of the new network. Moreover, the positioning for location validation can be performed without interrupting an access currently used for an ongoing IMS session, if the terminal supports multiple parallel accesses, e.g., simultaneous connections with a Wireless LAN and a mobile/cellular network.

When comparing locations obtained by means of two different access mechanisms, a valid location is preferably determined in the best possible way (e.g. with respect to feasibility, accuracy, response time, confidence, etc.), and it is also evaluated if a location can be deemed reliable or not. Furthermore, if no location information is available for a currently used network or network end point, a location may be obtained in one or several other networks.

As described above, the location of a used terminal may be validated according to this solution when handing over a session/user from one access network to another. For example, in a broadband access network with fixed end points, validation of the location of a terminal, or rather a network end point (a modem or router or access point) to which it is attached, can also be done when a session is handed over from that network to another one, or vice versa. In this case, the location may be validated by comparing the latest location obtained in the previous network with a new location obtained in the new network.

In one example, a terminal is handed over during an ongoing session from e.g. a mobile/cellular network to a Wireless LAN network. The validation can be made by using location information occurring in the header of an SIP message in the ongoing session, or by using the RE-REGISTER message being sent after handover, or alternatively by using any other messages carrying the location or other information (e.g. a cell ID) in any format that can be translated into a geographical location.

Two main options may then be used. One option is to validate the location in the new network (i.e. the given location of an end point or router) to which the terminal is handed over, by comparing it with a saved location in the old network from which the terminal is handed over. In this case, the most accurate available location in the old network should be used. Another option is to validate the location in the old network by using the location in the new network. A combination of these two options may also be used.

The P-Access-Network in the header typically only contains information on the location in the network the terminal is currently registered in. As a result, the location server will typically only obtain a location in the network to which the terminal is handed over during a session, unless the location is constantly monitored and updated. In this case, the validation procedure is simple since the location in the network handing over from is known. Then, the terminal may thus be adapted to save a location obtained in the old network, e.g. a cell ID, and add it to the RE-REGISTER message or any other suitable message being sent after handover to the new network.

Another way to achieve location validation in some situations may be as follows. A user/terminal may be registered in an access network where the location cannot be confirmed (as no confirmation can be done in such an "un-trusted" network, the confirmation is outdated or not valid for some other reason), either by means of a regular registration procedure or re-registration when the terminal is handed over to a new network. For example, a mobile terminal with WLAN capability may be handed over to a WLAN access from mobile/cellular access when the user enters his/her home environment. This network location, either an un-confirmed geographical location or a network address with no translated location, can then be marked as "unreliable" or "un-confirmed" when saved in a location database or the like. Next time the terminal is handed over from this WLAN access, i.e. the location being marked as unreliable in the database, a new location is obtained from the network handed over to, which is used to validate the unreliable location saved in the database, if equal. Thereby, the location of that WLAN access is saved and the unreliable marking can be removed or changed into "reliable" or the like.

Another way of providing location information of a terminal to a location server after handover from an old access network to a new one, which may be used for location validation, is to populate the above-mentioned P-Access-Network field with both a location obtained in the old network and a location obtained in the new network. When re-registering in a new network, it can be valuable to provide the location obtained in the old network, since this network connection is lost after the handover.

Apart from the above-described examples involving handover between different access networks, a validation process may be performed for the location of a terminal in other situations, e.g. when a new end point has been installed or authorized in an access network. Furthermore, a connection or end point must sometimes be confirmed in order to allow a terminal and/or user to register in an IMS network.

As mentioned above, the validation procedure may be triggered by various events. For example, it may be triggered when a new address occurs in the routing pass, or when a change is detected in the routing pass from the IMS network to an end point, The router or modem may have been replaced with a new one, or it may have been moved to another location. It may also be triggered when detecting that the power has been switched off/on in an end point, e.g. when a DHCP (Dynamic Host Configuration Control) server or router indicates that the connection with the end point has been lost and recovered. It may also be a standard procedure scheduled to perform a validation from time to time.

In further implementations, multiple devices and possibly also the end user may be, to some extent, actively involved for validating the location of a terminal. In one example, a wire line access of a first terminal, e.g. having a MAC address, may be validated by utilising a second terminal connected to a mobile/cellular network. The first terminal, or a client therein, may then initiate the validation procedure using the cellular access of the second terminal. It may then be somehow certified that the mobile terminal and the wire line terminal are located at the same place, which however is outside the scope of the present invention.

For example, a predefined control code or the like may be displayed at the first terminal and entered in the second terminal. To this end, bar codes or similar may be shown on the first terminal display (e.g. a computer). A local network connection of limited range between the first terminal and the second terminal may also be used, such as a Bluetooth or Wireless LAN connection. By sending a confirmation message from the mobile/cellular second terminal, and routing it with the wire line first terminal, the location information of the first terminal can be validated. Furthermore, the location server can verify how the message has traveled, making sure it has passed the first terminal, and validate by checking the routing paths and MAC addresses used by the connections.

The present invention, as described with reference to different embodiments above, offers a simple yet trustworthy mechanism for obtaining more reliable location information for a terminal connected to an access network. After being validated according to the present solution, the location information can be used to support various communication services, if needed or required, e.g. by supplying it to a called party and/or an application server or the like.

While the invention has been described with reference to specific exemplary embodiments, the description is in general only intended to illustrate the inventive concept and should not be taken as limiting the scope of the invention. Further, the invention is not limited to any particular services but may be used for providing location information for any type of communication service requiring such information. The present invention is defined by the appended claims.

The invention claimed is:

1. A method of providing a reliable location for a communication terminal, comprising the following steps:
    obtaining a first location for the terminal by means of a first access mechanism and a first positioning method,
    obtaining a second location for the terminal by means of a second access mechanism and a second positioning method,
    comparing the obtained first and second locations, and
    validating the location of the terminal as being reliable if the obtained first and second locations are found to be substantially equal if a difference there between does not exceed a predefined equality criterion,
    wherein said first and second access mechanisms are used in different access networks and the validated location of the terminal is used for deeming at least one of the first positioning method or the second positioning method as reliable for further location determinations without validation from another positioning method.

2. The method according to claim 1, wherein the validated location is used and/or saved to support any service(s) needing or requiring said location.

3. The method according to claim 2, wherein the validated location is saved by storage in a location server or database in a communication services network serving said terminal.

4. The method according to claim 3, wherein the validated location is indicated or marked as validated in said location server or database.

5. The method according to claim 1, wherein the validating is triggered when a re-registration message is received from the terminal after handover from an old access network to a new access network.

6. The method according to claim 5, wherein the old access network is an access network with fixed end points and the new access network is a mobile/cellular network, or vice versa.

7. The method according to claim 6, wherein the validated location of the terminal is used for validating the location of an end point used by the terminal in said access network with fixed end points.

8. The method according to claim 6, wherein the access network with fixed end points is a WLAN with user-provisioned end point locations, and locations in the mobile/cellular network can be obtained from cell IDs or by means of a triangulation method.

9. The method according to claim 1, wherein if the obtained first and second locations are not found to be substantially equal, new locations are obtained by means of said first and second access mechanisms alternately and each new obtained location is compared with the previously obtained location, until the location finally becomes validated when substantially equal according to both of said first and second access mechanisms.

10. The method according to claim 1, wherein if the obtained first and second locations are not found to be substantially equal, a new pair of locations are obtained for the terminal by means of the first and second access mechanisms, and the obtained new pair of locations are compared to validate the location of the terminal if found to be substantially equal.

11. The method according to claim 1, wherein the compared locations are found to be substantially equal if the difference there between does not exceed a predefined equality criterion.

12. The method according to claim 11, wherein if said substantially equal locations are different within the predefined equality criterion, a mean value of the substantially equal locations is calculated as the validated location, or one deemed more reliable than the other is selected as the validated location.

13. A system for providing a reliable location for a communication terminal, comprising:
   means for obtaining a first location for the terminal by means of a first access mechanism and a first positioning method,
   means for obtaining a second location for the terminal by means of a second access mechanism and a second positioning method,
   means for comparing the obtained first and second locations, and means for validating the location of the terminal as being reliable if the obtained first and second locations are found to be substantially equal if a difference there between does not exceed a predefined equality criterion,
   wherein said first and second access mechanisms are used in different access networks and the validated location of the terminal is used for deeming at least one of the first positioning method or the second positioning method as reliable for further location determinations without validation from another positioning method.

14. The system according to claim 13, further comprising means for using and/or saving the validated location to support any service(s) needing or requiring said location.

15. The system according to claim 14, further comprising means for saving the validated location by storage in a location server or database in a communication services network serving said terminal.

16. The system according to claim 15, further comprising means for indicating or marking the validated location as validated in said location server or database.

17. The system according to claim 13, wherein the validation process is triggered when a re-registration message is received from the terminal after handover from an old access network to a new access network.

18. The system according to claim 17, wherein the old access network is an access network with fixed end points and the new access network is a mobile/cellular network, or vice versa.

19. The system according to claim 18, further comprising means for using the validated location of the terminal for validating the location of an end point used by the terminal in said access network with fixed end points.

20. The system according to claim 18, wherein the access network with fixed end points is a WLAN with user-provisioned end point locations, and locations in the mobile/cellular network can be obtained from cell IDs or by means of a triangulation method.

21. The system according to claim 13, further comprising means for obtaining new locations by means of said first and second access mechanisms alternately, if the obtained first and second locations are not found to be substantially equal, and means for comparing each new obtained location with the previously obtained location, until the location finally becomes validated when substantially equal according to both of said first and second access mechanisms.

22. The system according to claim 13, further comprising means for obtaining a new pair of locations for the terminal by means of the first and second access mechanisms, if the obtained first and second locations are not found to be substantially equal, and means for comparing the obtained new pair of locations to validate the location of the terminal if found to be substantially equal.

23. The system according to claim 13, wherein the compared locations are found to be substantially equal if the difference there between does not exceed a predefined equality criterion.

24. The system according to claim 23, further comprising means for calculating a mean value of the compared substantially equal locations as the validated location or for selecting one deemed more reliable than the other as the validated location, if the two compared locations are different within the predefined equality criterion.

* * * * *